(12) United States Patent
Navalgund

(10) Patent No.: US 8,923,851 B2
(45) Date of Patent: Dec. 30, 2014

(54) SYSTEM AND METHOD FOR ROAMING BAND PREFERENCE

(75) Inventor: Aparna Navalgund, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 146 days.

(21) Appl. No.: 13/606,285

(22) Filed: Sep. 7, 2012

(65) Prior Publication Data
US 2014/0073319 A1    Mar. 13, 2014

(51) Int. Cl.
*H04W 4/00*    (2009.01)
*H04W 28/02*    (2009.01)
*H04W 28/00*    (2009.01)

(52) U.S. Cl.
CPC .............. *H04W 28/00* (2013.01); *H04W 28/02* (2013.01)
USPC ......... 455/432.1; 455/525; 455/444; 455/252

(58) Field of Classification Search
CPC ...... H04W 72/04; H04W 48/00; H04W 48/20
USPC .................. 455/525, 444, 452.2; 370/252
See application file for complete search history.

(56) References Cited

U.S. PATENT DOCUMENTS

| | | | |
|---|---|---|---|
| 7,020,439 B2 | 3/2006 | Sinivaara et al. | |
| 7,596,371 B2 | 9/2009 | Ginzburg et al. | |
| 7,864,736 B2 | 1/2011 | Yashar et al. | |
| 8,089,939 B1 | 1/2012 | Mater et al. | |
| 8,095,129 B2 | 1/2012 | Adams et al. | |
| 2008/0102845 A1 | 5/2008 | Zhao | |
| 2010/0054179 A1 | 3/2010 | Meyer | |
| 2010/0124924 A1 | 5/2010 | Cheng et al. | |
| 2010/0246551 A1 | 9/2010 | Chen et al. | |
| 2010/0246651 A1 | 9/2010 | Baheti et al. | |
| 2011/0216692 A1 | 9/2011 | Lundsgaard et al. | |
| 2011/0235591 A1 | 9/2011 | Iyer et al. | |
| 2012/0163228 A1* | 6/2012 | Sung et al. ................... 370/252 |

(Continued)

FOREIGN PATENT DOCUMENTS

| | | |
|---|---|---|
| EP | 2 056 639 A2 | 5/2009 |
| EP | 2 077 690 A2 | 7/2009 |
| WO | 2004109534 | 12/2004 |
| WO | 2009/064931 A1 | 5/2009 |

OTHER PUBLICATIONS

International Search Report and Written Opinion for counterpart International Patent Application No. PCT/US2013/055699 mailed Nov. 15, 2013.

(Continued)

*Primary Examiner* — David Q Nguyen

(57) ABSTRACT

A system and method determines a roaming access point (AP) using a band preference. The method includes generating a list including APs communicating in a communication network. A mobile unit is configured to connect to the communication network. The method includes determining an initial AP rating value for each of the APs as a function of a predetermined network parameter. The method includes generating a further AP rating value as a function of the initial AP rating value and a predetermined preference list of operating bands. The predetermined preference list is indicative of at least one operating bandwidth in which the MU prefers to connect. The method includes selecting one of the APs as a function of the further AP rating values. The method includes connecting the MU to the selected AP.

18 Claims, 2 Drawing Sheets

(56) References Cited

U.S. PATENT DOCUMENTS

2012/0190401 A1* 7/2012 Makabe .................. 455/525
2013/0225194 A1* 8/2013 Sung et al. ............... 455/452.2
2014/0045505 A1* 2/2014 Henry et al. .............. 455/444

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 8), 3GPP TS 36..304, V8.1.0, vol. 36.304, No. V8.1.0, Mar. 2008, pp. 30, XP002547669, section 5.2 Cell selection and reselection.
International Search Report and Written Opinion for International Patent Application No. PCT/US2010/060180 mailed Mar. 14, 2011.
Non-Final Office Action mailed Mar. 1, 2012 in U.S. Appl. No. 12/715,725, Soren K Lundsgaaard et al., filed Mar. 2, 2010.
Notice of Allowance mailed Sep. 9, 2013 in U.S. Appl. No. 12/715,725, Soren K Lundsgaaard et al., filed Mar. 2, 2010.

* cited by examiner

SYSTEM AND METHOD FOR ROAMING BAND PREFERENCE

FIELD OF THE DISCLOSURE

The present disclosure relates generally to a mobile device roaming in a network and more particularly to selecting an access point in which to connect as a function of further criteria.

BACKGROUND

In an infrastructure network, an access point (AP) may be configured with a Basic Service Set (BSS). Further APs may also have respective BSS's with the combination thereof with the first access point creating an Extended Service Set (ESS). Initially, a client such as a mobile unit may be connected to one of the APs based on, for example, location. As the client moves, it is possible to move out of the BSS of the currently connected AP. That is, the client is moving out of the coverage area of the currently connected AP and moving into a coverage area of a different AP in the same ESS (i.e., roam). In such a case, the client starts a scanning process to find other APs in the environment and determine a more appropriate AP in which to connect.

Conventional methods of roam scanning may entail sending probe requests in available channels and stay in the respective channel for a predetermined time to receive the probe responses from the APs. Through these probe responses from the APs, the client may choose a better AP and connect to it for a roam. However, the AP to which the client roams is often determined upon only signal strength. That is, other criteria that may provide a better connection to the network or a preferred connection may be overlooked. For example, an AP operating on a 2.4 GHz band may be given preference over an AP operating on a 5 GHz band since the 2.4 GHz AP may have a slightly higher signal strength. However, the client may have a better performance when connected to the 5 GHz AP.

Accordingly, there is a need for a system and method for providing a roam to an AP using further criteria so that a preferred connection is established.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
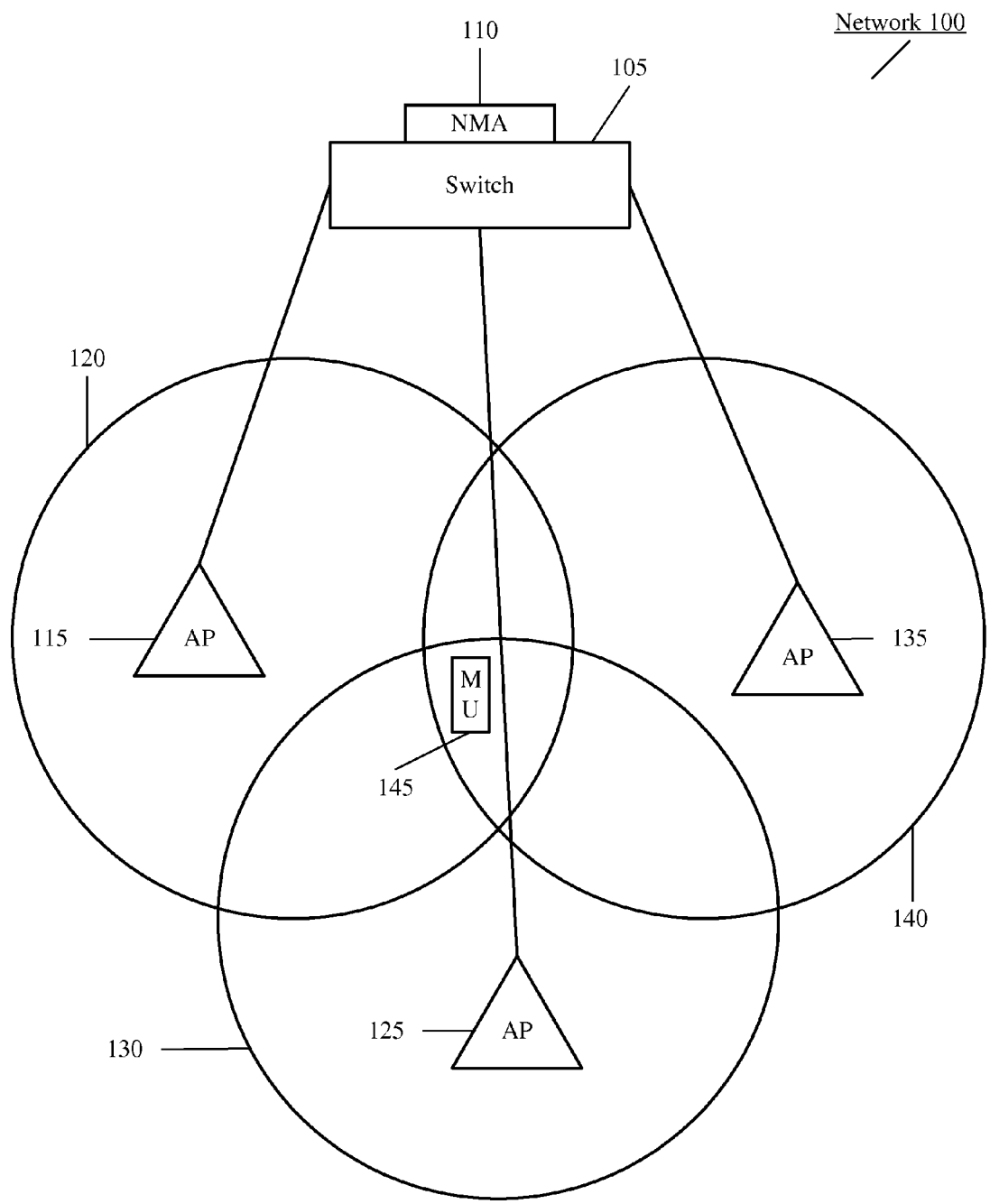
FIG. 1 is a block diagram of a network in accordance with some embodiments.
Figure 2:
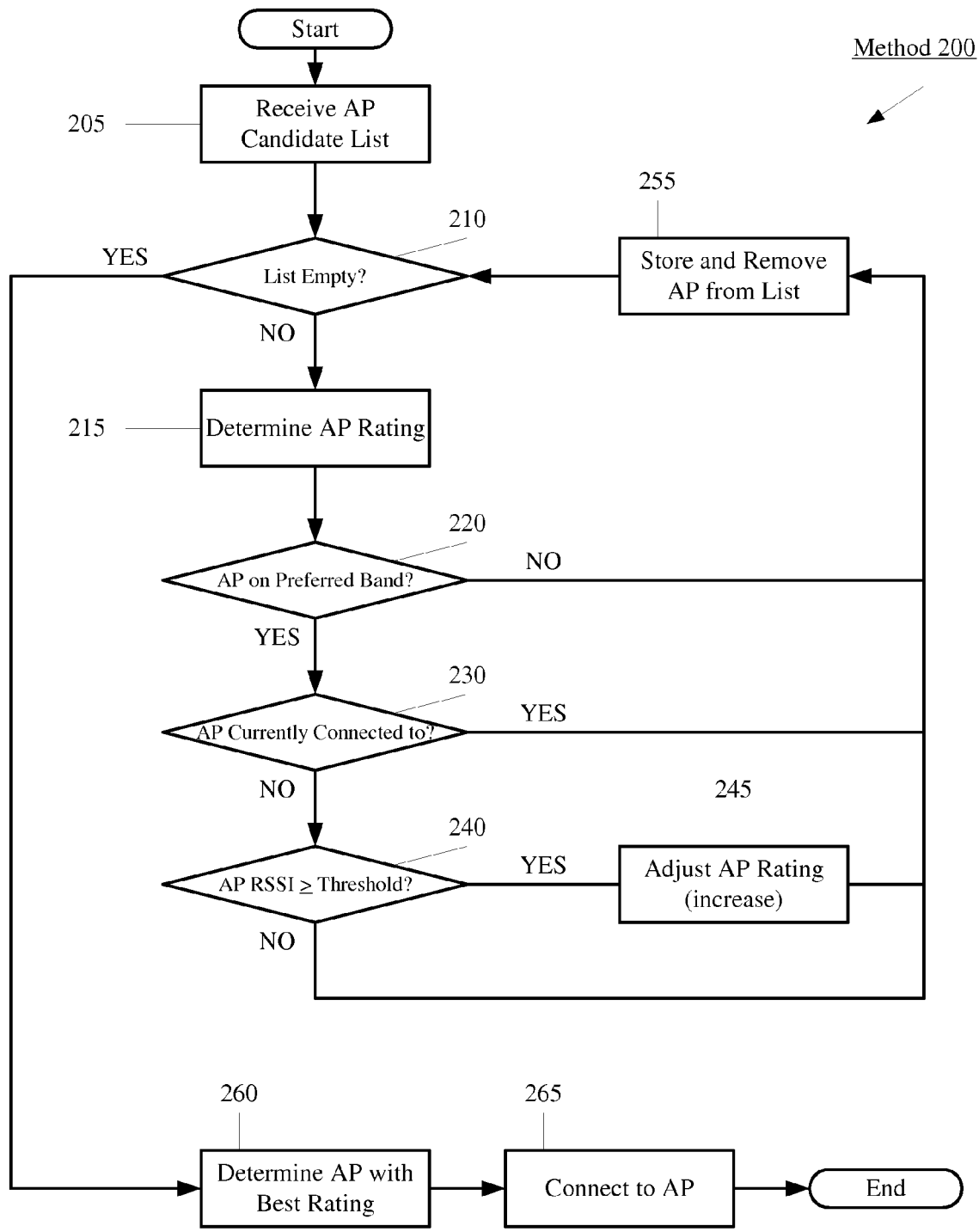
FIG. 2 is a flowchart of a method for determining an AP in which to roam in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a system and method for roaming band preference. The method comprises generating a list including APs communicating in a communication network, a mobile unit configured to connect to the communication network. The method comprises determining an initial AP rating value for each of the APs as a function of a predetermined network parameter. The method comprises generating a further AP rating value as a function of the initial AP rating value and a predetermined preference list of operating bands, the predetermined preference list being indicative of at least one operating bandwidth in which the mobile unit prefers to connect. The method comprises selecting one of the APs as a function of the further AP rating values. The method comprises connecting the mobile unit to the selected AP.

The exemplary embodiments may be further understood with reference to the following description and the appended drawings, wherein like elements are referred to with the same reference numerals. The exemplary embodiments describe a system configured for a roaming band preference. Specifically, when a client such as a mobile unit (MU) roams from a coverage area of a currently connected AP to a coverage area of a roaming AP, the roaming AP is selected as a function of an AP rating that is a function of a set of criteria and an additional predetermined band preference. Accordingly, the roaming AP may have a weaker signal strength (RSSI) but still be selected as the roaming AP as a preferred connection is established. The currently connected AP, the roaming AP, the client (MU), the switch, the AP rating, the set of criteria, the predetermined band preference, and a related method will be discussed in further detail below.

FIG. 1 is a block diagram of a network 100 in accordance with an exemplary embodiment of the present invention. The network 100 may be any network format such as 802.11 b/g/r and may also be any type of network such as LAN, WLAN, VPN, etc. The network 100 may include a switch 105, a network management arrangement (NMA) 110, a plurality of access points (AP) 115, 125, 135, each AP including a respective operating area 120, 130, 140, and a client such as a mobile unit (MU) 145. It should be noted that the system 100 may include a variety of other conventional network components such as a database.

The switch 105 and the NMA 110 may provide conventional functionalities such as routing data (e.g., packets, voice, etc.) from one end point to another end point, from a network component to another network component, etc. According to the exemplary embodiments, the switch 105 may also provide a further feature regarding a roam functionality as a function of the predetermined band preference. As will be described in further detail below, the switch 105 may be configured to provide data to the MU 145 for the roam functionality to be executed for selecting an AP in which the MU 145 roams as a function of the predetermined band preference with consideration of other roaming criteria such as RSSI. It should be noted that according to another exemplary embodiment, the switch 105 may select the roaming AP for the MU 145.

The APs 115, 125, and 135 may be network components that enable an expansion of the operating area available for a client that is disposed in the network 100. Accordingly, the AP 115 may have the operating area 120, the AP 125 may have the operating area 130, and the AP 135 may have the operating area 140. It should be noted that the use of three APs is only exemplary and the present invention may be adapted for a network that has more or fewer than three APs. The APs 115, 125, and 135 may each be configured with a Basic Service Set (BSS) for the respective operating area. Combined, the BSS's of the APs 115, 125, and 135 may create an Extended Service Set (ESS) so that a client that is disposed in the network 100 may roam from one operating area (e.g., operating area 120) into a neighboring operating area (e.g., operating area 130). The APs 115, 125, and 135 may allow for wired or wireless connectivity with end points disposed in the respective operating areas. The APs 115, 125, and 135 may also be connected with a wired connection to the switch 105.

In addition, the APs 115, 125, 135 may be configured with at least one operating bandwidth. Those skilled in the art will understand that a network may include a plurality of different operating bandwidths. An operating bandwidth refers to the data rate supported by a network connection or interface. Specifically, the operating bandwidth represents the overall capacity of the connection, thus the greater the capacity, the more likely that better performance will result. Bandwidth is the amount of data that passes through a network connection over time as measured in bits per second (bps), kilobits per second (kbps), megabits per second (mbps), etc. Each of the APs 115, 125, 135 may include different operating bandwidths. For example, a first MU may be configured to connect to the network 100 with a first operating bandwidth but not configured to connect with a second operating bandwidth while a second MU is configured to connect with the network 100 with the first and second operating bandwidths. Thus, in an exemplary embodiment where the AP 115 is only configured with the first operating bandwidth, the AP 125 is only configured with the second operating bandwidth, and the AP 135 is configured with the first and second operating bandwidths, the first MU may connect to the network via the AP 115 and the AP 135 while the second MU may connect to the network via all the APs 115, 125, 135. As will be discussed in further detail below, the MU may be better configured for a connection with the network 100 by a particular operating bandwidth. In another exemplary embodiment given the conditions of the APs 115, 125, 135 stated above, the first and second MUs may both be configured for the first and second operating bands. However, if the first MU has a preference for the first operating band while the second MU has a preference for the second operating band, the first MU may desire to connect to the network via APs 115 and 135 while the second MU may desire to connect to the network via APs 125 and 135.

The MU 145 may be any mobile device configured to connect to the network 100. For example, the MU 145 may include a wireless transceiver configured to transmit and receive data with the AP 115 as shown in FIG. 1. The MU 145 may be configured to select the roaming AP as a function of the predetermined band preference. Thus, the MU 145 may include a processor configured to execute the roaming functionality that determines the roaming AP in which to roam. However, as noted above, the switch 105 may also be configured to select the roaming AP.

According to the exemplary embodiments of the present invention, the roaming functionality may be performed by the switch 105 or the MU 145. The description below will be described with reference to the MU 145 performing the roaming functionality but it should be noted that the switch 105 may perform substantially the same features. However, when the switch 105 performs the roaming functionality, the switch 105 may select the roaming AP but provide a manual or automatic switch to the roaming AP. For example, the switch 105 may determine the roaming AP and automatically switch the connectivity of the MU 145 to the roaming AP or may provide data to the MU 145 with a request for switching the connectivity to the network 100 via the selected roaming AP upon a confirmation from the MU 145.

Initially, the MU 145 may generate a candidate list of available APs in which to connect. The MU 145 may send probe requests to the various APs in the network 100. Thus, when a probe response is received, the MU 145 may include the responding APs into the candidate list. The probe response may further include a RSSI value indicating a signal strength of the responding AP. It should be noted that the MU 145 may already be connected to the network 100. In such a case, the switch 105 may provide the candidate list of available APs and associated RSSI values. The switch 105 may further determine the candidate list as a function of the location of the MU 145 and the coverage areas of the APs 115, 125, 135.

Once the candidate list of APs has been generated, the MU 145 may determine an initial rating value of the APs in the candidate list. The initial AP rating value for each of the APs may be determined using a conventional set of criteria. For example, as discussed above, the RSSI value for each of the APs in the candidate list may be used as an initial parameter in determining the AP rating value. In another example, a network latency value associated with the APs in the candidate list may be considered in determining the initial AP rating value.

According to the exemplary embodiments of the present invention, upon determining the initial AP rating value of each AP in the candidate list, the MU 145 may adjust the initial AP rating value as a function of the predetermined band preference. The predetermined band preference may be an ordered list of operating bandwidths in which the MU 145 is configured for connectivity to the network 100. The predetermined band preference may relate to a performance parameter. That is, the MU 145 may connect to the network 100 with an operating bandwidth and the performance parameter is with regards to the connection that provides better throughput and/or performance. The predetermined band preference may also be respective to a particular MU 145. That is, each MU 145 may include its own predetermined band preference as a function of the components of the MU 145, its connectivity functionality, etc. The predetermined band preference may be determined prior to the generation of the candidate list. Accordingly, the predetermined band preference may be stored locally in a memory arrangement of the MU 145. It should also be noted that when the switch 105 is configured with the roaming functionality, the switch 105 may store the predetermined band preference for each MU 145, for example, in a network database. It should further be noted that the predetermined band preference may be determined upon connection to the network 100. For example, an initial configuration step to the network 100 may include determining and generating the predetermined band preference. Accordingly, the predetermined band preference may be generated upon a first connection to the network 100 and connecting to the service set identifier (SSID). However, the predetermined band preference may be updated accordingly, for example, hardware components are changed in the MU 145 that enable the MU 145 to be configured with a different operating bandwidth.

After the determination of the initial AP rating value, the MU 145 may determine if a first one of the APs on the candidate list is on a preferred band indicated on the predetermined band preference. If the AP is not configured with one of the predetermined band preference, the MU 145 may store the respective AP rating value as the initial AP rating value as no adjustment is made. If the AP is a currently serving AP such as when the AP is already connected to the network 100, the MU 145 may also store the respective AP rating value of the serving AP as the initial AP rating value. However, if the AP operates on the predetermined band preference and is not the serving AP, the MU 145 may determine if the AP on the candidate list has a signal strength (RSSI) greater than a predetermined threshold. The predetermined threshold may be a fixed value determined as a function of the above described performance parameter that enables the MU 145 to operate in the network with better throughput/performance. Thus, if the RSSI of the AP in the candidate list is greater than (or equal to) the predetermined threshold, the initial AP rating may be adjusted. According to a preferred exemplary embodiment of the present invention, the initial AP rating may be increased by a predetermined amount. In a first example, depending on how much higher the RSSI is compared to the predetermined threshold, the predetermined amount may also be adjusted so that a higher RSSI value increases the initial AP rating value greater than a lower RSSI value. In a second example, as long as the RSSI is greater than the predetermined threshold, a fixed amount may be added to the initial AP rating for the adjustment. Accordingly, after the adjustment, the AP is stored with the new AP rating value. If the RSSI value of the AP is not greater than the predetermined threshold, the initial AP rating value may be used. The MU 145 may continue to analyze the APs in the candidate list in this manner until the AP rating of all the APs in the candidate list are determined and/or adjusted.

After the above analysis, the MU may determine the AP with the best (e.g., highest) AP rating. Once the AP with the best AP rating is determined from the above described steps, the MU 145 may select that AP in which to roam. As described above and as would be understood by those skilled in the art, the roaming AP may have an AP rating that is greater than a further AP that may have a better signal strength. However, the roaming AP operates on an operating bandwidth that is indicated on the predetermined band preference which results in a better performance/throughput on the network 100. It should be noted that the roaming AP may operate on the predetermined band preference and have the highest signal strength. The exemplary embodiments of the present invention allow for an AP that may not have the highest signal strength to still be selected as a function of the predetermined band preference. Subsequently, the MU 145 may connect to the network 100 via the selected roaming AP. As discussed above, when the switch 105 determines and selects the roaming AP, the switch 105 may transmit data regarding this selection to the MU 145. The MU 145 may then be automatically or manually switched to the roaming AP.

FIG. 3 is a flowchart of a method 200 for determining an AP in which to roam in accordance with some embodiments. The method 200 relates to selecting a roaming AP as a function of the predetermined band preference. Further criteria may be considered initially in determining the initial AP rating. The method 200 will be described with reference to the MU 145 performing the roaming functionality. However, it should again be noted that the switch 105 may also be configured with the roaming functionality. The method 200 will be described with reference to the network 100 of FIG. 1.

In step 205, the MU 145 receives the candidate list of available APs. As discussed above, the MU 145 may transmit probe requests. Any AP that receives the probe request may generate and return a probe response to the MU 145. Thus, according to a first exemplary embodiment of the present invention, the MU 145 may generate the candidate list of available APs. The probe responses may also include the RSSI value associated with the AP. It should be noted that if the MU 145 is already connected to the network 100, the candidate list of available APs may also include the AP in which the MU 145 is currently connected. According to a second exemplary embodiment, the switch 105 may determine the available APs for the MU 145 and generate the candidate list of available APs with the associated RSSI values. Subsequently, the switch 105 may transmit the candidate list and the MU 145 receives the list.

In step 210, a determination is made whether the candidate list is empty. As will be described in further detail below, step 210 may be used as a step to examine whether each AP in the candidate list has been analyzed. If the candidate list is not empty, a first one of the APs in the candidate list is analyzed. Thus, the method 200 continues to step 215.

In step 215, the initial AP rating value for the AP is determined. As described above, the initial AP rating may be determined using conventional criteria. For example, the RSSI value associated with the AP may be used in determining the initial AP rating value. As such, when compared to a further AP, if the AP has a first RSSI value greater than a second RSSI value of the further AP, the AP may have a higher initial AP rating value. In another example, the network latency may be used in determining the initial AP rating value.

In step 220, a determination is made whether the AP is on a preferred band. As discussed above, the MU 145 may be configured for a better performance/throughput on a particular operating bandwidth in comparison to other operating bandwidths. Accordingly, a predetermined band preference list may be used to determine whether the AP is on the preferred band. If the AP is not on the preferred band, the method 200 continues to step 255. In step 255, the AP rating is set as the initial AP rating for the AP. The AP and its respective AP rating are stored. The AP is also removed from the candidate list. Subsequently, the method 200 returns to step 210. However, returning to step 220, if the AP is on the preferred band, the method 200 continues to step 230.

In step 230, a determination is made whether the MU 145 is currently connected to the network via the AP. That is, a determination is made whether the AP is the serving AP for the MU 145. As discussed above, the MU 145 may already be connected to the network 100. If the AP being analyzed is the serving AP, the initial rating value is set for the AP rating of this AP. Accordingly, in a substantially similar manner as described above, the method 200 continues to step 255. However, if the AP is not the serving AP, the method 200 continues to step 240.

In step 240, a determination is made whether the RSSI from the AP is above a predetermined threshold. The RSSI value associated with the AP (as determined when generating the candidate list) may be used for this comparison to the predetermined threshold. As discussed above, the predetermined threshold may be set as a function of the performance that would be acceptable for the better performance/throughput. If the RSSI is less than the predetermined threshold, the method 200 continues to step 255 and the AP rating is set as the initial AP rating value. However, if the RSSI is greater than (or equal to) the predetermined threshold, the method 200 continues to step 245. In step 245, the initial AP rating is adjusted. Specifically, the initial AP rating is increased. As discussed above, the increase to the initial AP rating may be performed in a variety of ways such as a dynamic value determined as a function of how much greater the RSSI value is to the predetermined threshold or a fixed amount. After the AP rating of the AP is determined in step 245, the method 200 continues to step 255 where the new AP rating is stored for the AP.

After the selected AP is analyzed via steps 215-245, the method 200 continues to step 255 and the method 200 returns to step 210. Accordingly, step 210 is repeated where the determination if the candidate list is empty is made. If APs remain in the candidate list, the method 200 repeats in steps 215-255 to determine the AP ratings for each of the remaining APs in the candidate list. Once all APs in the candidate list have been analyzed, the method 200 continues from step 210 to step 260. In step 260, the AP in the candidate list having the best AP rating (e.g., highest AP rating) is determined so that in step 265, the selected AP is connected thereto by the MU 145.

The exemplary embodiments of the present invention provide a system and method for selecting an AP in which a MU roams. Specifically, criteria related to a predetermined band preference is used to select the AP. The MU may be configured for a higher performance when using a preferred operating bandwidth. Accordingly, the system and method according to the exemplary embodiments of the present invention provide a means for selecting the roaming AP as a function of this preference. The exemplary embodiments of the present invention may further consider other criteria such as conventional standards including RSSI and network latency to select the AP. Accordingly, the roaming AP may have a lower signal strength than a further AP but still be selected as the roaming AP if configured with an operating bandwidth indicated on the predetermined band preference.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method, comprising:
    generating a candidate list including access points (AP) communicating in a communication network in which a mobile unit (MU) is configured to connect;
    determining an initial AP rating value for each of the APs as a function of a predetermined network parameter;
    generating a further AP rating value as a function of the initial AP rating value and a predetermined preference list of operating bands, wherein the further AP rating value is the initial AP rating value for APs in the candidate list that are not configured with the at least one operating bandwidth indicated on the predetermined preference list, and further wherein the predetermined preference list is indicative of at least one operating bandwidth in which the MU prefers to connect;
selecting one of the APs as a function of the further AP rating values; and
connecting the MU to the selected AP.

2. The method of claim 1, wherein the selected AP is configured to operate in the at least one operating bandwidth indicated in the predetermined preference list and has a lower signal strength than a further AP of the candidate list.

3. The method of claim 1, wherein the predetermined network parameter is at least one of a signal strength and a network latency associated with each of the APs.

4. The method of claim 1, wherein the further AP rating value is the initial AP rating value for a serving AP in which the MU is currently connected.

5. The method of claim 1, further comprising:
transmitting, by the MU, a probe request to the APs in the communication network;
receiving, by the MU, a probe response from the APs in the communication network; and
including the APs in the candidate list if the probe response was received respectively therefrom.

6. The method of claim 1, further comprising:
determining, by a switch of the communication network, the APs included in the candidate list; and
transmitting the candidate list to the MU.

7. The method of claim 1, further comprising:
storing the further AP rating values with the respective AP;
removing the AP from the candidate list; and
repeating the generating of the further AP rating value step for each remaining AP in the candidate list.

8. The method of claim 1, further comprising:
generating the predetermined preference list of operating bands prior to the generation of the candidate list; and
storing the predetermined preference list.

9. The method of claim 8, wherein the predetermined preference list is stored in one of a local memory arrangement of the MU and a network database of the communication network.

10. A system, comprising:
a switch of a communication network communicating with a plurality of APs, each AP including a respective operating area, the operating areas generating a network operating area;
a client device disposed within the network operating area of the communication network and configured to connect to the communication network, the client device configured to generate a candidate list of APs communicating in the communication network, the client device further configured to determine an initial AP rating value for each of the APs as a function of a predetermined network parameter, the client device generating a further AP rating value as a function of the initial AP rating value and a predetermined preference list of operating bands, wherein the further AP rating value is the initial AP rating value for APs in the candidate list that are not configured with the at least one operating bandwidth indicated on the predetermined preference list, and further wherein the predetermined preference list being indicative of at least one operating bandwidth in which the client device prefers to connect,
wherein the client device selects one of the APs as a function of the further AP rating values and connects to the selected AP.

11. The system of claim 10, wherein the selected AP is configured to operate in the at least one operating bandwidth indicated in the predetermined preference list and has a lower signal strength than a further AP of the candidate list.

12. The system of claim 10, wherein the initial AP wherein the predetermined network parameter is at least one of a signal strength and a network latency associated with each of the APs.

13. The system of claim 10, wherein the further AP rating value is the initial AP rating value for a serving AP in which the client device is currently connected.

14. The system of claim 10, wherein the client device transmits a probe request to the APs in the communication network, receives a probe response from the APs in the communication network, and includes the APs in the candidate list if the probe response was received respectively therefrom.

15. The system of claim 10, wherein the switch determines the APs included in the candidate list and transmits the candidate list to the client device.

16. The system of claim 10, wherein the client device generates the predetermined preference list of operating bands prior to the generation of the candidate list and stores the predetermined preference list.

17. The system of claim 16, wherein the predetermined preference list is stored in one of a local memory arrangement of the client device and a network database of the communication network.

18. A computer readable storage medium including a set of instructions executable by a processor, the set of instructions operable to:
generate a candidate list of access points (AP) in a communication network in which a mobile unit (MU) is configured to connect;
determine an initial AP rating value for each of the APs in the candidate list as a function of at least signal strength;
generate a further AP rating value by adjusting the initial AP rating value as a function of a predetermined preference list of operating bands, wherein the further AP rating value is the initial AP rating value for APs in the candidate list that are not configured with the at least one operating bandwidth indicated on the predetermined preference list, and further wherein the predetermined preference list indicating at least one operating bandwidth in which the MU prefers to connect;
select one of the APs in the candidate list in which the MU is to connect as a function of a highest one of the further AP rating values; and
connect the MU to the selected AP.

* * * * *